March 18, 1952 E. MITTELMANN 2,589,417
APPARATUS FOR HEATING AND MIXING PLASTIC COMPOSITIONS
Filed March 22, 1949
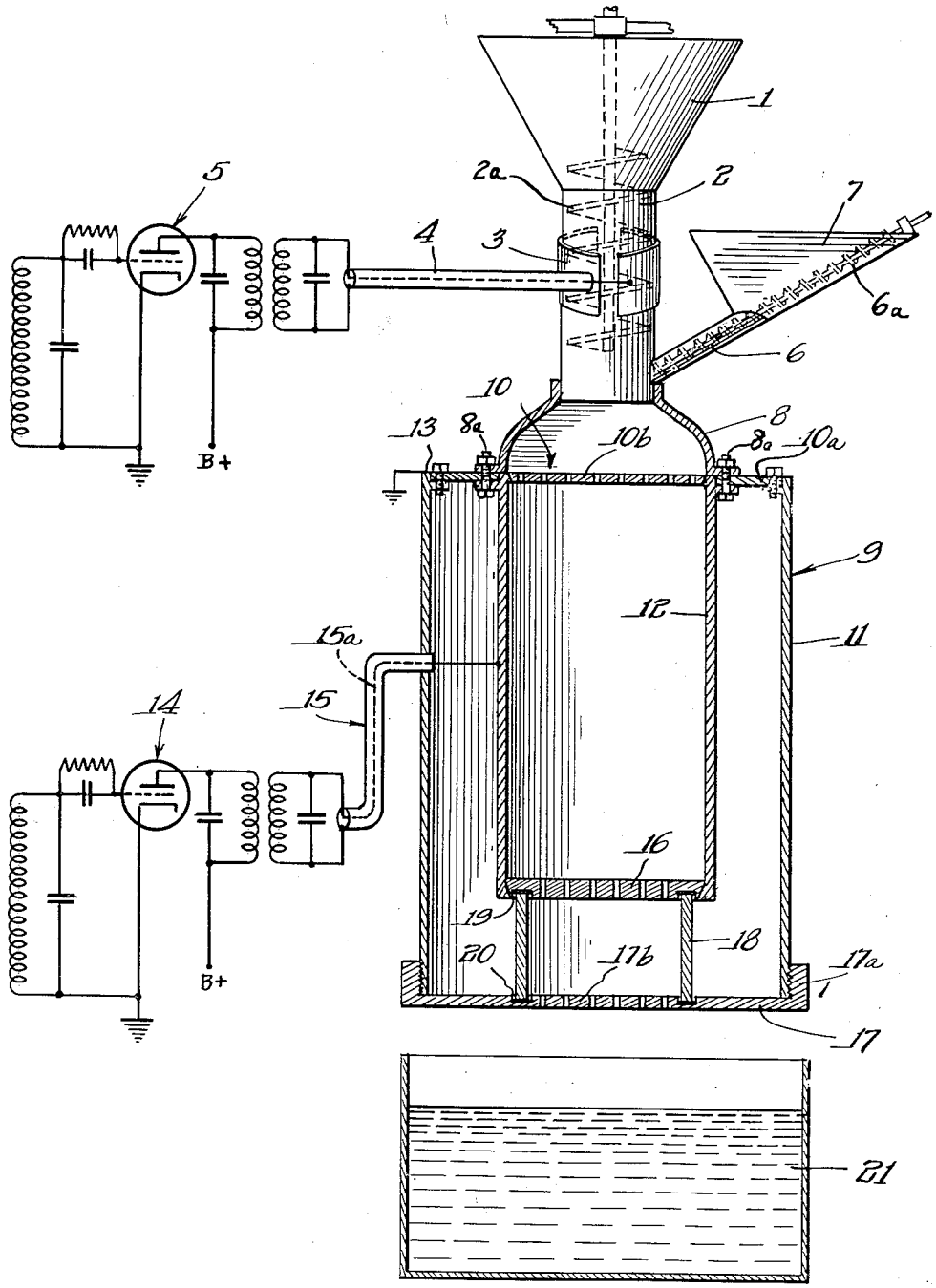
INVENTOR.
Eugene Mittelmann
BY
Moore, Olson & Trexler
Attys.

Patented Mar. 18, 1952

2,589,417

UNITED STATES PATENT OFFICE 2,589,417

APPARATUS FOR HEATING AND MIXING PLASTIC COMPOSITIONS

Eugene Mittelmann, Chicago, Ill., assignor to Henry Jenett, Montclair, N. J.

Application March 22, 1949, Serial No. 82,774

8 Claims. (Cl. 219—47)

The present invention concerns methods and means for processing plastic material to produce reversibly gellable stripcoating compositions, as disclosed in the prior applications of Henry Jenett, Serial No. 620,413, filed October 4, 1945, now abandoned; Serial No. 628,381, filed November 13, 1945, now abandoned, and Serial No. 737,431, filed March 26, 1947, now abandoned.

More particularly, the invention relates to methods and means for heating and mixing necessary components or substances to obtain highly refined dispersions of such plastic materials.

In the manufacture of such plastics it is necessary, as pointed out in said applications, to form a most intimate mix or dispersion of the usually pulverulent resins, the liquid solvents, and all other desirable modifying agents, such as plasticizers, extenders, colorants, etc., in order that the plastic stock may be of uniform quality or characteristics throughout. In the processing of plastic materials to form such reversibly gellable strip-coating compositions it is necessary, as pointed out in said applictaions, to mix or disperse the solids in the solvent while the solvent is maintained at a predetermined elevated temperature at which the solvents have a swelling action on the resins, producing a non-cohesive, gruel-like, mobile, non-settling mass, free from lumps and air pockets, and thereafter when all the solids have been distributed to raise the temperature of the mix or dispersion to a higher temperature, approaching the boiling point of the solvent, so that as the temperature increases the mix or dispersion becomes more and more coherent, the viscosity increases while the mass approaches the character of a solution both in consistency and translucency, and when heating is continued will cause a drop in viscosity and the material will thus assume a perfect transparency and can be applied immediately to form a transparent coating which on cooling becomes a reversible gel, or the material can be stored as a reversible gel in suitable containers and thereafter reliquefied by heating and applied in the same manner to coat any desired article with a transparent, easily strippable coating. Heretofore, such dispersions or compositions have been obtained by "batch processing," which is exceedingly slow and cumbersome and the rate of yield is relatively low.

Not only is the rate of yield or production unsatisfactorily low, but proper control to provide a satisfactory product presents many problems because of the extreme intimacy of the mix required and the inability to prevent localization of the heating by conventional heating means.

Previous attempts to increase the rate of yield and overcome the difficulties of the "batch process" by a continuous mixing and heating process have not been successful. Hot oil or steam when passed through ducts in the walls of a continuous mixing chamber or conduit produce difficulties of disuniform heating of the material or dispersion so that the material adjacent the walls of the chamber or conduit are heated too much and the materials more distant from the walls are insufficiently heated.

Such conventional methods and equipment, while suitable for eutectic materials or those having at least reasonably good heat transfer properties, are entirely unsatisfactory in the case of materials especially adaptable to the products involved in this invention, such as cellulose derivatives and resins which are notoriously poor heat transfer media.

It is accordingly a primary object of the present invention to provide a method and device for producing plastics, and particularly reversibly gellable stripcoating compositions by a continuous heating and mixing process, increasing the rate of yield of the product and providing a product of greater uniformity.

It is an ancillary object of the invention to provide method and means for uniformly heating the solvent and the dispersions of solids and liquid solvents in a plastic mix in order to produce plastics of uniform quality by a continuous process.

It is known that by high frequency heating, dielectric materials may be heated uniformly, and since the components of materials of plastic stock are generally dielectric, the use of that type of heating is naturally suggested. However, it has been found impossible to heat such material by conventional dielectric methods and machines because of the low flash point of the solvents commonly used and the danger of a destructive fire or explosion resulting from an arc drawn between the heating electrodes or between an electrode and the material, as commonly occurs with conventional high potential, high frequency machines.

Accordingly, it is an object of this invention to provide a novel high frequency heating method, machine or device capable of satisfactorily and uniformly heating such inflammable plastic material and components.

A further object of the invention is to provide a machine or device by means of which the solvent and the solids necessary to produce a plastic stock may be intimately mixed or dispersed, and also properly and uniformly heated to produce plastic stock by a continuous process, namely, by one in which the solvent and solids are continuously fed to the machine or device and the plastic stock continuously delivered by the machine or device.

The present invention, therefore, contemplates preheating the solvent by means of a conventional dielectric heater completely insulated from the material, then adding the resins or solids and passing the material through a strainer plate for starting the uniform dispersion of the resins or solids throughout the solvent and then through a coaxial line terminated by a capacitance wherein the material is further mixed and again heated. The line is excited by a high frequency generator and with its terminating capacitance is electrically equivalent to an open circuited line of a length equal to one-quarter the wave length of the oscillations generated by the exciting generator. If it is desired, the equivalent length of the line may be equal to any odd multiple of a quarter wave length.

Other and further objects and advantages of the invention will be apparent from the following description when taken in connection with the accompanying drawing.

A hopper 1 is fastened to or formed integral with a glass tube 2 on which the electrodes 3 of a conventional dielectric heater are placed. A screw 2a of suitable material may be included in the glass tube 2 for forcing material down and may be secured in position and driven by any desirable means. The electrodes 3 are fed by a coaxial cable 4 from a high frequency power oscillator 5 which may be of any desired type. Below the electrodes 3 a resin feed tube 6 having a feed screw 6a enters the glass tube 2 from a hopper 7. The resin feed tube 6 may be joined to the glass tube 2 in any suitable manner or formed integral with it. A casting 8 joins the glass tube 2 to the coaxial line structure 9. The casting 8 is attached to the glass tube in any desired manner and is preferably bolted to the end plate 10 of the coaxial line 9 by bolts 8a.

The coaxial line structure itself consists of an outer tube 11 and an inner tube 12, both tubes being constructed of copper or other suitable material. The two tubes 11 and 12 are capped by the metal plate 10 consisting of a ring 10a which may be bolted atop the outer tube 11 by bolts threaded into an inner peripheral flange of the tube 11, and a perforated section 10b having peripheral chamfered edge and set within the inner tube 12. The inner tube 12 has a peripheral flange adjacent its top end and is secured to the ring 10a by the bolts 8a. The coaxial line structure is grounded at the top end at 13 and is fed from any suitable high frequency power oscillator 14 through a coaxial cable 15. It is not essential that two oscillators 5 and 14 be used. A single oscillator could be used and connected to both the preheater 3 and the coaxial line structure, but its output would have to be as great as the combined outputs of the two oscillators. The inner conductor 15a of the cable 15 is connected to the inner tubing 12 of the coaxial line structure 9. These connections are made at a suitable distance from the end plate 10 to properly match the impedance of the oscillator 14 to that of the line structure 9 and its load for the optimum transfer of energy. The inner tube 12 is terminated by a perforated plate 16 having a chamfered edge cooperating with a chamfered flange at the lower extremity of the tube 12. An end plate 17 is provided with threaded flanges 17a which cooperate with threads on the outside surface of the end of the outer tube 11 so that the end plate 17 may be screwed onto the tube 11. As the end plate 17 is screwed on it clamps a hardened glass cylinder 18 between it and a perforated plate 16. If the plate 16 is not wedged into place it will be forced down by the material being processed later. The circular area 17b of the plate 17 circumscribed by the cylinder 18 is also perforated. Gaskets 19 and 20 set in annular grooves in the plates 16 and 17 respectively provide fluidtight joints between the plates and the cylinder 18. The perforated circular area 17b and the perforated plate 16 form the plates of the heating capacitor terminating the line. A receptacle 21 collects the processed plastic material.

This invention is intended primarily to compound compositions which essentially are consolidated coatings formed from a solution containing 15 to 50 per cent solids comprising high polymers and copolymers of mono-olefinic compounds in association with volatile liquids which dissolve the high polymers at temperatures approaching the boiling point of these volatile liquids and which will not dissolve or swell the resin at ordinary room temperatures, but will remain attached to the resin without precipitation on cooling the hot solution to room temperature, the vehicle being reversibly a clear liquid at elevated temperatures and a translucent or transparent gel at ordinary room temperature.

In the present invention the solvent, which is selected with respect to the particular resin employed is first placed in the hopper 1 from whence it may be forced through the glass tube 2 by the screw 2a where it is heated by means of the conventional dielectric heater 3 completely insulated from the solvent to a temperature which must be just below the temperature of incipient solubility of the given resin. The resin in powdered form is then placed in the hopper 7 and is forced through the resin feed tube 6 by the screw 6a where it is added to the solvent. The temperature of the solvent causes the resin particles to swell instantly, thus preventing settling, lumping, the occlusion of air, and similar phenomena which deleteriously affect the making of concentrated solutions and which could not be avoided if the resin came into contact with either cool or hot solvent or air. Following the introduction of the resin, the solvent and resin are passed through and mixed by the mixing strainer plate 10b into the inner conductor 12 of the coaxial line where they are further mixed by turbulence and diffusion. As the material passes through the perforated plate 16 of the terminating capacitor, it is further mixed and as it moves through the glass cylinder between the plates 16 and 17b is concurrently heated by dielectric loss. This heating raises the temperature of the material nearly to the boiling point of the solvent and at this point the material acquires perfect transparency and loses body. The material then passes out through the strainer plate 17b and may be used immediately or allowed to cool in the container 21 in which case it turns into a gel which on reheating will revert to a clear solution.

A typical example of the materials to be acted on is as follows: Sixty pounds of methyl-isobutyl ketone and twelve pounds of tricresyl phosphate are put in the hopper 1 and are heated to a temperature of 45 degrees C. to 50 degrees C. by the electrodes 3. Twenty-eight pounds of polyvinyl chloride are then introduced into the warm liquid by the resin feed tube 6 from the hopper 7 and mixed therewith by the strainer plates 10b and 16b and the inner conductor 2 of the coaxial line so as to permit the solids to become thoroughly wetted by the liquids. At the temperature mentioned the solvent exerts a swelling action on the resin producing a non-cohesive, gruel-like, mobile, non-settling mass free from lumps and air pockets.

Following the introduction and distribution of the solids the temperature of the composition is raised by high frequency electric currents between the capacitor plates 16 and 17b within a very few minutes to a degree approaching the boiling point of the solvent. With increasing temperature the composition becomes more and more coherent and the viscosity increases while the mass approaches the character of a solution, both in consistency and in translucency. Heating to about 100 degrees C. will cause a drop in viscosity which then remains constant for any given concentration of solids while giving perfect translucency, at which stage the material becomes a reversibly gellable true solution.

At the plate 17 heating is discontinued and the composition may either be used for immediate application or it may be drawn into the shipping or storage container 21 where, upon cooling as previously mentioned, it will form a reversible gel which can be reliquified by means of heating.

Other formulations which might well be acted on may be found in the application by Henry Jenett, Serial No. 628,381, filed November 13, 1945, now abandoned.

It is evident that due to the equivalent quarter wave length construction of this invention the entire device can be constructed of metal, save for the two glass cylinders 2 and 18. Since the top part of the coaxial line structure is grounded at 13 there is no potential at the top to cause a spark or endanger an operator. The entire external structure, aside from the top part, is at a low potential with the only high potential in the apparatus occurring at the perforated plate 16 which is inaccessible during operation. Consequently, there is a minimum of danger of fire and of shock hazard to the operator. It is further apparent that the structure may be readily taken apart for cleaning by removing a few bolts, lifting out a few parts and unscrewing the bottom plate.

Whereas a specific embodiment of my invention has been shown and described, it is evident that many variations can be made within the spirit and scope of the appended claims.

I claim:

1. An apparatus for the continuous processing of a fluent plastic material, said apparatus comprising a coaxial line structure having an inner conductor and an outer conductor, said outer conductor being of greater length than said inner conductor, said line structure also including a terminating capacitance, means for feeding plastic material through one of said conductors and through said terminating capacitance, and a radio frequency oscillator exciting said line structure, the inlet end of said line structure being at ground potential and the outlet end being at a low potential, said line structure and terminating capacitance being electrically equivalent to an open circuited line one quarter the wave length of the oscillations generated by said oscillator.

2. An apparatus for the continuous processing of a plastic material, said apparatus comprising a radio frequency oscillator, a coaxial line structure terminated by a capacitor and excited by said oscillator, said line structure and terminating capacitor having an electrical length equivalent to an open circuited line one quarter of the wave length of the oscillations of said oscillator, means for introducing said plastic material into said coaxial line structure, means for mixing said plastic material, means for introducing said plastic material into said capacitor for mixing said plastic material and concurrently heating it by radio frequency electric currents and means for removing said plastic material from between the plates of said capacitor.

3. An apparatus for the continuous processing of a plastic material, said apparatus comprising a radio frequency oscillator, a coaxial line structure terminated by a capacitor and excited by said oscillator, said line structure and terminating capacitor having an electrical length equivalent to an open circuited line one quarter of the wave length of the oscillations of said oscillator, means for introducing said plastic mixture into said coaxial line structure, and means for passing said plastic material through the plates of said capacitor for mixing said plastic material and concurrently heating it by radio frequency electric currents.

4. An apparatus for the continuous processing of a plastic material, said apparatus comprising inlet means for a solvent, high frequency means for heating said solvent, inlet means for a solid, means for mixing said solid and said solvent, a passageway through which the mixture is passed, said passageway comprising a longitudinal section of a coaxial line, a plurality of means at the end of said line for further mixing said solid and said solvent, said latter means being separated by an insulating cylinder and forming a capacitor in which said plastic material is heated, and a high frequency generator connected to said line by a coaxial cable for supplying energy thereto.

5. An apparatus for the continuous processing of a plastic material, said apparatus comprising inlet means for a solvent, high frequency means for heating said solvent, inlet means for a solid, means for mixing said solid and said solvent, a passageway through which the mixture is passed, said passageway comprising a longitudinal section of a coaxial line, a plurality of means at the end of said line for further mixing said solid and said solvent, said latter means being separated by an insulating cylinder and forming a capacitor in which said plastic material is heated, and a high frequency generator connected to said line by a coaxial cable for supplying energy thereto, said line and terminating capacitor being electrically equivalent to an open circuited line one quarter the wave length of the oscillations generated by said generator.

6. An apparatus as described in claim 5 in which the coaxial cable from the high frequency generator is attached to the equivalent quarter wave-length coaxial line structure at such a distance from the inlet end of the line structure as to provide an optimum match between the high frequency generator and the coaxial line structure and its terminating capacitor.

7. An apparatus for the continuous processing of a plastic material, said apparatus comprising inlet means for a solvent, means for heating said solvent, inlet means for a solid, means for mixing said solid and said solvent, a passageway through which the mixture is passed, said passageway comprising a longitudinal section of a co-axial line, a plurality of means at the end of said line for further mixing said solid and said solvent, said latter means including a plurality of spaced-apart plates forming a capacitor in which said solid and solvent are heated, and a high frequency generator connected to said line for supplying energy thereto.

8. Apparatus as set forth in claim 7 in which the co-axial line and capacitor are electrically equivalent to an open circuited line one-quarter the wave length of the oscillations generated by the high frequency generator.

EUGENE MITTELMANN.

REFERENCES CITED

The following references are of record in the file of this patent:

UNITED STATES PATENTS

| Number | Name | Date |
| --- | --- | --- |
| 1,972,050 | Davis | Aug. 28, 1934 |
| 2,308,416 | Dreisbach | Jan. 12, 1943 |
| 2,319,852 | Doolittle | May 25, 1943 |
| 2,446,557 | Schutz et al. | Aug. 10, 1948 |
| 2,458,563 | Collins | Jan. 11, 1949 |
| 2,459,260 | Brown | Jan. 18, 1949 |
| 2,465,102 | Joy | Mar. 22, 1949 |
| 2,473,143 | Graham et al. | June 14, 1949 |

FOREIGN PATENTS

| Number | Country | Date |
| --- | --- | --- |
| 517,798 | Great Britain | Feb. 8, 1940 |
| 567,731 | Great Britain | Feb. 28, 1945 |
| 571,814 | Great Britain | Sept. 11, 1945 |